US012586503B2

(12) United States Patent
Kim

(10) Patent No.: US 12,586,503 B2
(45) Date of Patent: Mar. 24, 2026

(54) INTERPOLATION AMPLIFIER AND SOURCE DRIVER COMPRISING THE SAME

(71) Applicant: Anapass Inc., Seoul (KR)

(72) Inventor: Chang Hwan Kim, Seoul (KR)

(73) Assignee: ANAPASS INC., Seoul (KR)

(*) Notice: Subject to any disclaimer, the term of this patent is extended or adjusted under 35 U.S.C. 154(b) by 0 days.

(21) Appl. No.: 18/884,318

(22) Filed: Sep. 13, 2024

(65) Prior Publication Data

US 2025/0096758 A1 Mar. 20, 2025

(30) Foreign Application Priority Data

Sep. 15, 2023 (KR) ........................ 10-2023-0122887

(51) Int. Cl.
*G09G 3/20* (2006.01)
*G09G 3/36* (2006.01)

(52) U.S. Cl.
CPC ............. *G09G 3/20* (2013.01); *G09G 3/3696* (2013.01); *G09G 2310/0291* (2013.01)

(58) Field of Classification Search
CPC . G09G 3/3696; G09G 2310/0291; G09G 3/20
See application file for complete search history.

(56) References Cited

U.S. PATENT DOCUMENTS

| | | | | |
|---|---|---|---|---|
| 7,369,075 B2 * | 5/2008 | Ishii | H03M 1/76 341/145 |
| 7,414,561 B1 | 8/2008 | Brubaker | |
| 10,600,383 B2 * | 3/2020 | Song | G09G 3/3614 |
| 2018/0082654 A1 * | 3/2018 | Song | H03F 3/45192 |
| 2021/0111680 A1 * | 4/2021 | Liu | G09G 3/20 |
| 2023/0335040 A1 * | 10/2023 | Yu | G09G 3/3696 |

FOREIGN PATENT DOCUMENTS

| | | | | |
|---|---|---|---|---|
| KR | 10-2011-0045755 A | 5/2011 | | |
| KR | 10-2018-0031286 A | 3/2018 | | |
| KR | 20230148715 A | * 10/2023 | G09G 3/36 | |

OTHER PUBLICATIONS

Korean Office Action for related KR Application No. 10-2023-0122887 mailed Oct. 11, 2023 from Korean Intellectual Property Office.

* cited by examiner

*Primary Examiner* — Gene W Lee
(74) *Attorney, Agent, or Firm* — Paratus Law Group, PLLC

(57) ABSTRACT

This embodiment provides an interpolation amplifier including an input stage, a load stage, and an output stage, the input stage includes a plurality of connection source modules to which an input signal with a plurality of bits is provided, the connection source modules each include a first differential pair and a second differential pair to which an input voltage is input and an output voltage of the interpolation amplifier is fed back and input, a first current source connected to the first differential pair to provide a bias current, and a second current source connected to the second differential pair to provide a bias current, sources of the first differential pairs included in two or more of the connection source modules are connected to each other, and sources of the second differential pairs included in the two or more of the connection source modules are connected to each other.

12 Claims, 9 Drawing Sheets

INTERPOLATION AMPLIFIER AND SOURCE DRIVER COMPRISING THE SAME

CROSS-REFERENCE TO PRIOR APPLICATION

This application claims priority to Korean Patent Application No. 10-2023-0122887 (filed on Sep. 15, 2023), which is hereby incorporated by reference in its entirety.

BACKGROUND

The present disclosure generally relates to an interpolation amplifier and a source driver including the same.

In display devices, a source driver that drives a display panel provides a pixel voltage to a panel load connected to a source line, and a scan signal is provided to a gate driver to display an image on the display panel. The source driver provides pixel voltages, which correspond to digital image data provided by a timing controller, to pixels included in the display panel through lines to form an image on the display panel.

SUMMARY

As display technology advances, resolution continues to increase. Furthermore, pixel voltages provided to pixels are becoming increasingly denser to form better quality images. In order to generate and provide these voltages to pixels, an amplifier interpolates and generates the voltages. However, since conventional interpolation amplifiers had nonlinear characteristics, an interpolation amplifier and a source driver capable of resolving the nonlinear characteristics were required.

The present disclosure is directed to providing an interpolation amplifier capable of alleviating the nonlinear characteristics, and a source driver including the interpolation amplifier.

According to an aspect of the present disclosure, there is provided an interpolation amplifier including an input stage, a load stage, and an output stage, wherein the input stage includes a plurality of connection source modules to which an input signal with a plurality of bits is provided, the connection source modules each include a first differential pair and a second differential pair to which an input voltage is input and an output voltage of the interpolation amplifier is fed back and input, a first current source connected to the first differential pair to provide a bias current, and a second current source connected to the second differential pair to provide a bias current, sources of the first differential pairs included in two or more of the connection source modules are connected to each other, and sources of the second differential pairs included in two or more of the connection source modules are connected to each other.

According to another aspect of the present invention, there is provided an interpolation amplifier for outputting a voltage corresponding to an input signal with a plurality of bits, the interpolation amplifier including an input stage including a plurality of unit modules configured to receive one bit of the plurality of bits of the input signal and generate a current corresponding to the bit, a load stage configured to generate a voltage corresponding to the current output by the input stage, and an output stage configured to output the voltage generated by the load stage, wherein an output voltage generated in the output stage is fed back and input to the input stage, and the input stage includes the number of unit modules corresponding to the number of bits of the input signal.

According to still another aspect of the present disclosure, there is provided a source driver for driving a plurality of pixels included in a display panel, the source driver including an interpolation amplifier configured to output a voltage corresponding to an input signal with a plurality of bits, wherein the interpolation amplifier includes an input stage including a plurality of unit modules configured to receive one bit of the plurality of bits of the input signal and generate a current corresponding to the bit, a load stage configured to generate a voltage corresponding to the current output by the input stage, and an output stage configured to output the voltage generated by the load stage, wherein an output voltage generated in the output stage is fed back and input to the input stage, and the input stage includes the number of unit modules corresponding to the number of bits of the input signal.

According to the present embodiment, there are provided a source driver and an interpolation amplifier including an input stage with improved nonlinearity.

DETAILED DESCRIPTION

Figure 1:
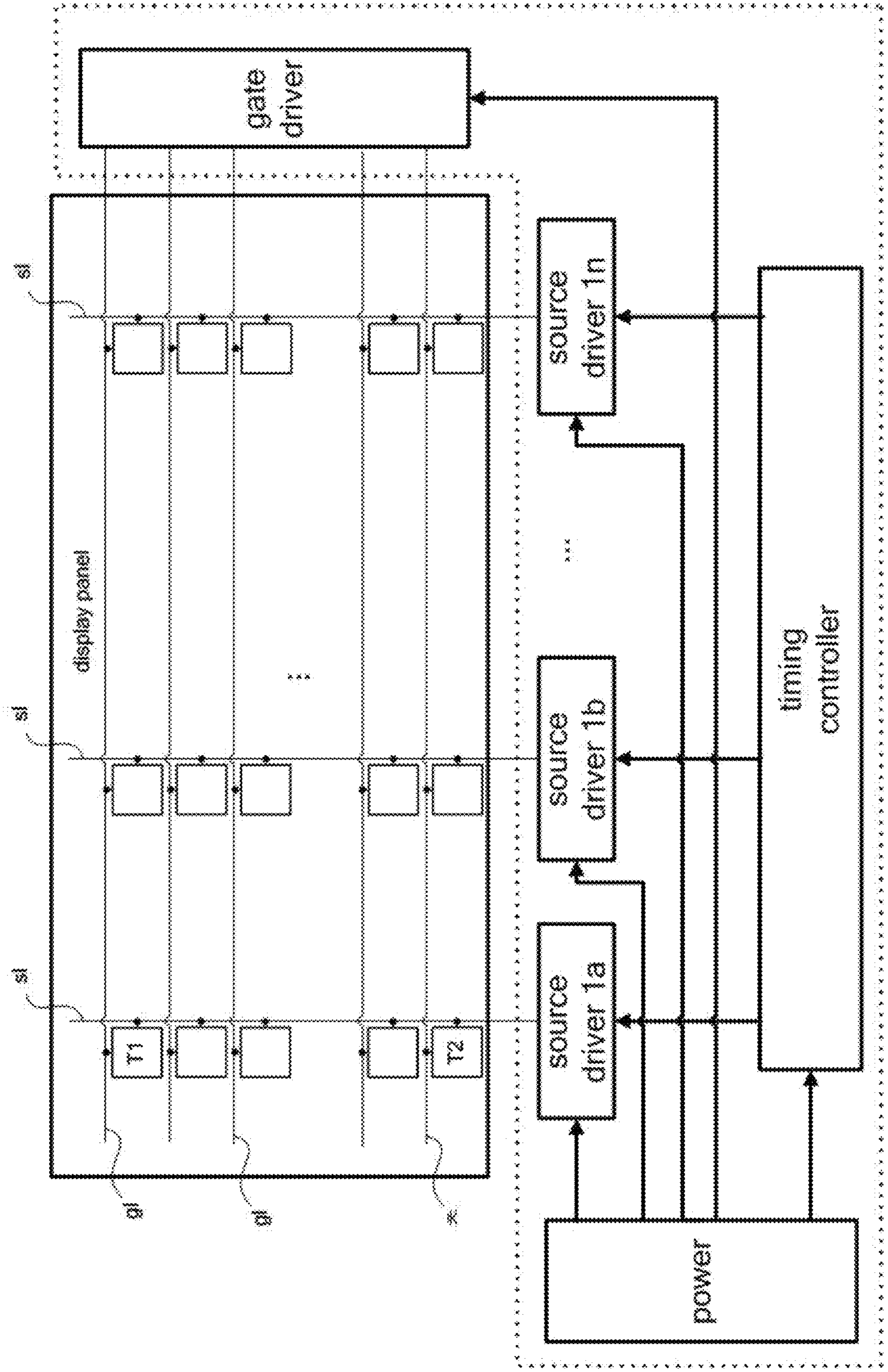
FIG. 1 is a schematic diagram illustrating a display system.

Hereinafter a source driver and a display device according to the present embodiment will be described with reference to the accompanying drawings. FIG. 1 is a schematic view illustrating a display system. Referring to FIG. 1, a display system according to the present embodiment includes a display panel, a gate driver, source drivers 1*a*, 1*b*, . . . , and 1*n*, and a timing controller that changes the characteristics of a screen source applied from the outside or adjusts a driving timing according to the resolution and characteristics of the display system. According to the characteristics of the display panel, the timing controller and the source drivers 1*a*, 1*b*, . . . , and 1*n* may be formed as separate chips, and as shown in the illustrated drawing, the timing controller and the source drivers 1*a*, 1*b*, . . . , and 1*n* may be implemented as one chip.

The display panel includes a plurality of pixels T1 and T2, and each pixel is connected to the gate driver through gate lines g1 and is electrically connected to the source drivers 1*a*, 1*b*, . . . , and 1*n* through source lines s1. The source line transmits to each pixel a grayscale signal that should be displayed by the pixel.

The source line s1 up to the pixel consists of a conductive line, and there are a resistive component of the conductive line and various parasitic capacitances such as parasitic capacitance between adjacent lines and parasitic capacitance with a reference electrode. Such loads and switches such as thin film transistors in the pixels may be modeled as resistor-capacitor pairs (RC pairs). That is, a load which should be driven by the source driver has a configuration of the form of a distributed resistance-capacitance (distributed RC).

Figure 2:
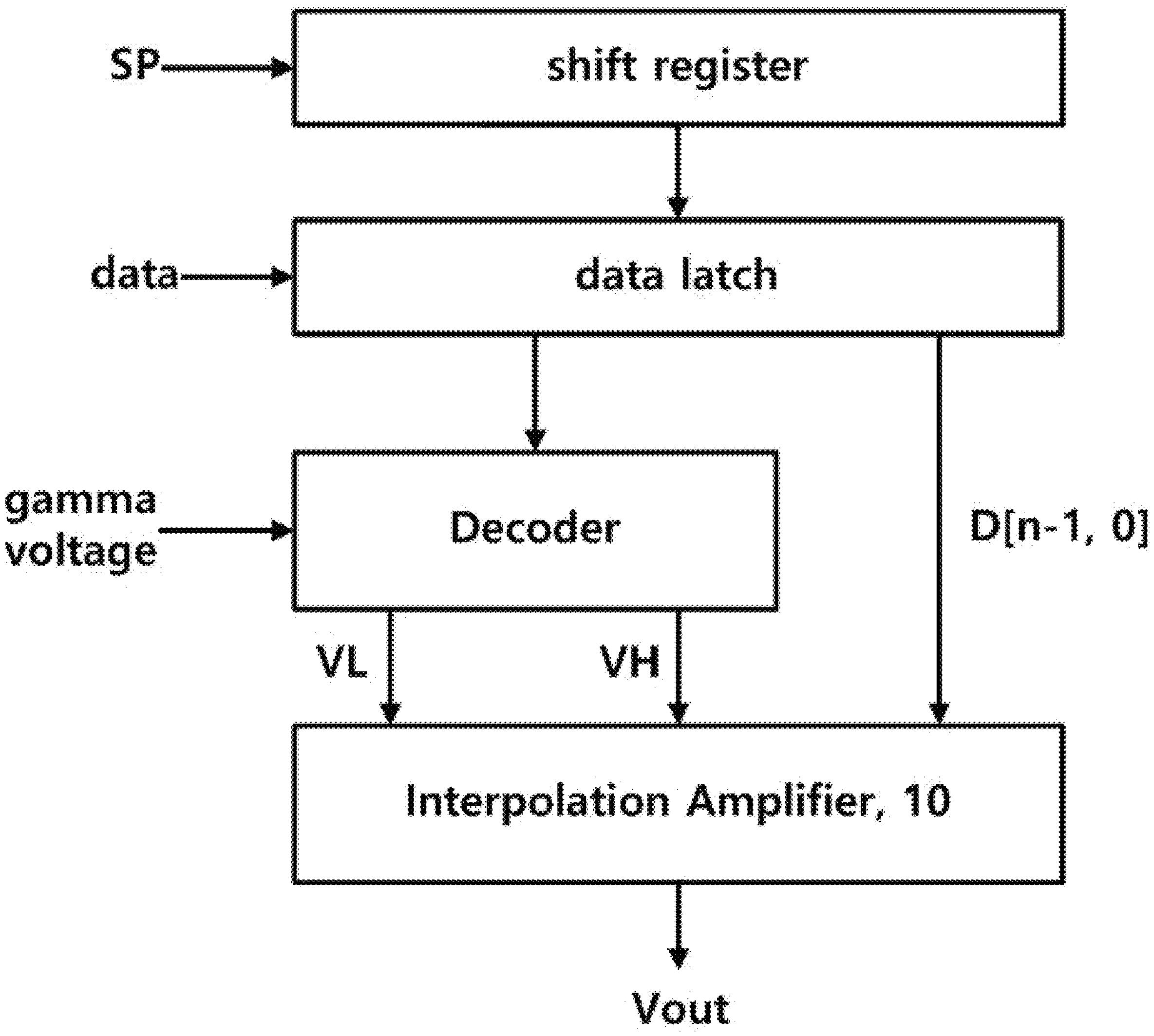
FIG. 2 is a block diagram illustrating a path through which pixel data is provided to a display panel.

FIG. 2 is a block diagram illustrating a path through which pixel data is provided to a display panel. Referring to FIG. 2, a signal provided to the display panel is provided to pixels of the display panel through a shift register, a data latch, a sample/hold register (S/H register), a gate driver circuit, a digital-to-analog converter (DAC), and an interpolation amplifier 10.

The shift register sequentially shifts and outputs input start pulses SP. The data latch latches up and provides image data. In one embodiment, there may be provided the S/H register that samples a latched-up image signal according to the start pulse SP and holds and provides sampled data.

A decoder, for example, receives a plurality of gamma voltages and pixel data, selects a high voltage VH and a low voltage VL corresponding to the pixel data from the gamma voltages, and outputs the selected voltage to the interpolation amplifier 10. The interpolation amplifier 10 receives a voltage between the high voltage VH and the low voltage VL and pixel data D[n−1, 0], interpolates the voltage between the high voltage VH and the low voltage VL to correspond to the provided pixel data D[n−1, 0], and outputs the interpolated voltage Vout.

Figure 3:
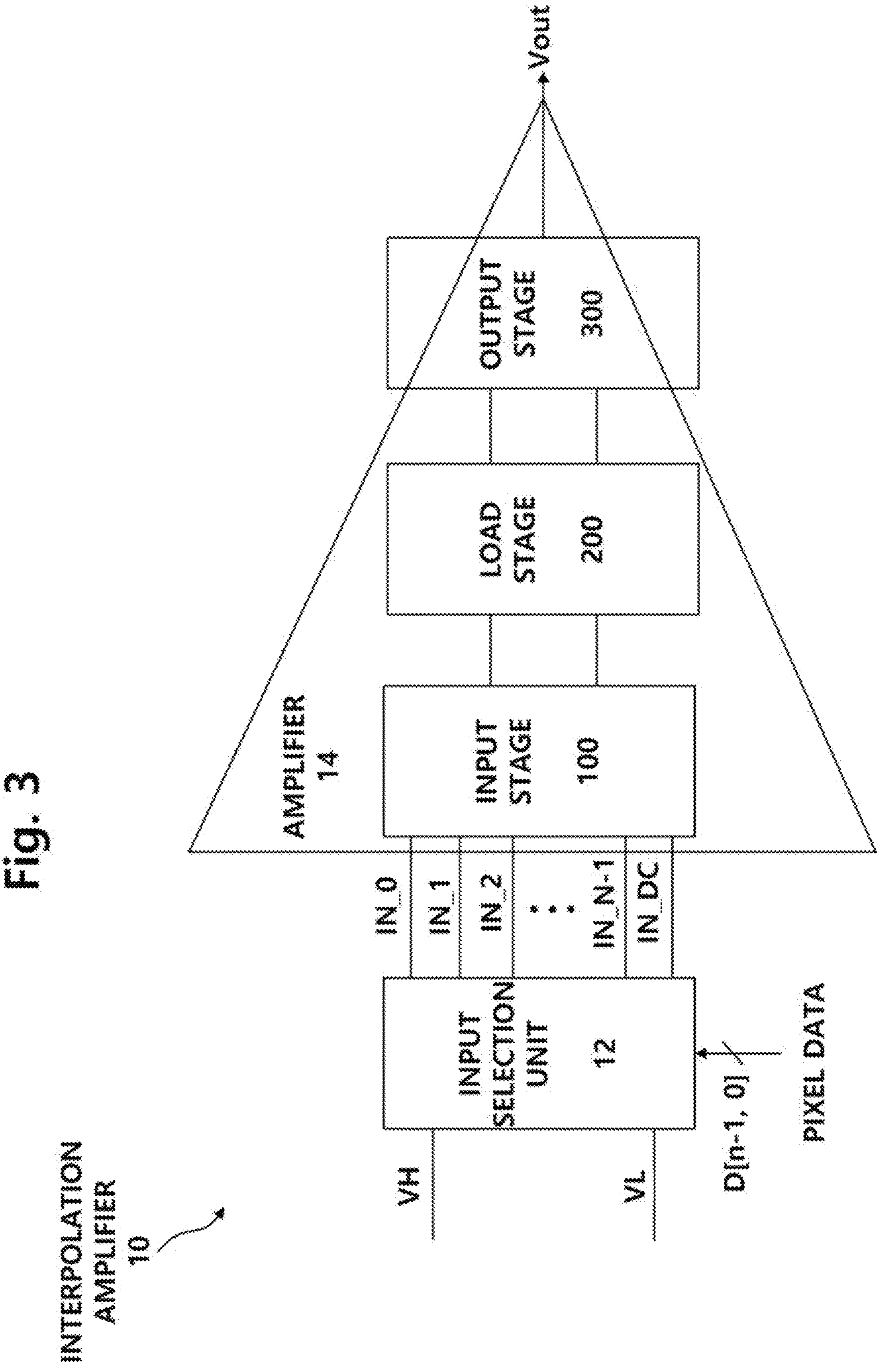
FIG. 3 is a block diagram illustrating an outline of an interpolation amplifier according to the present embodiment.
Figure 4A:
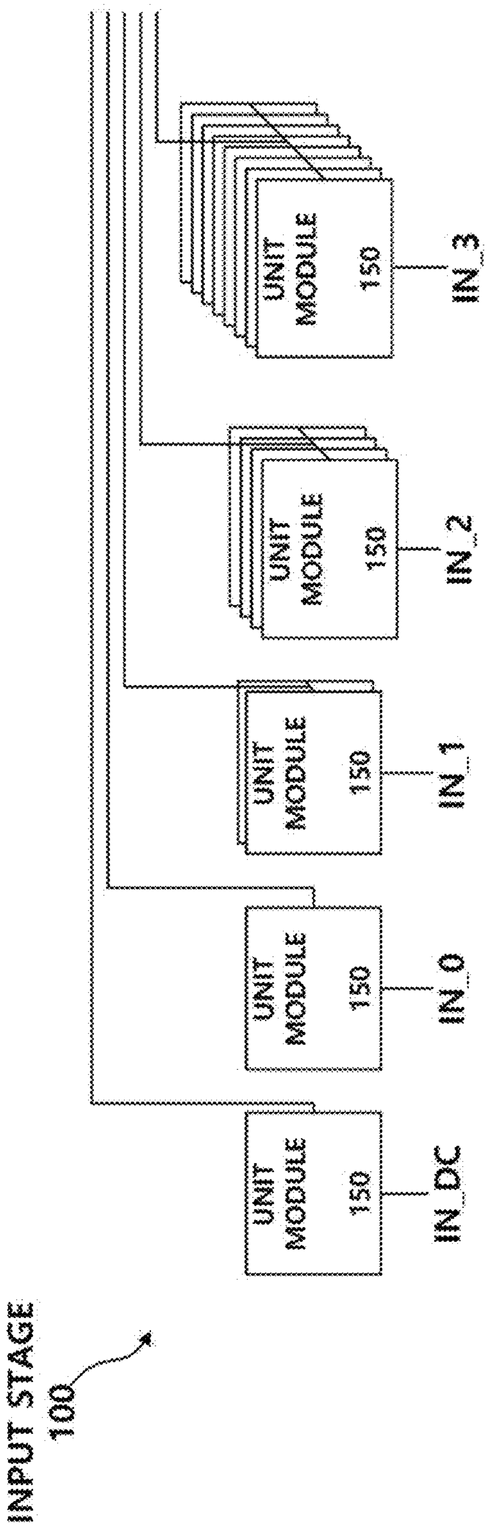
FIGS. 4A and 4B are block diagrams illustrating an outline of an input stage according to the present embodiment.
Figure 4B:
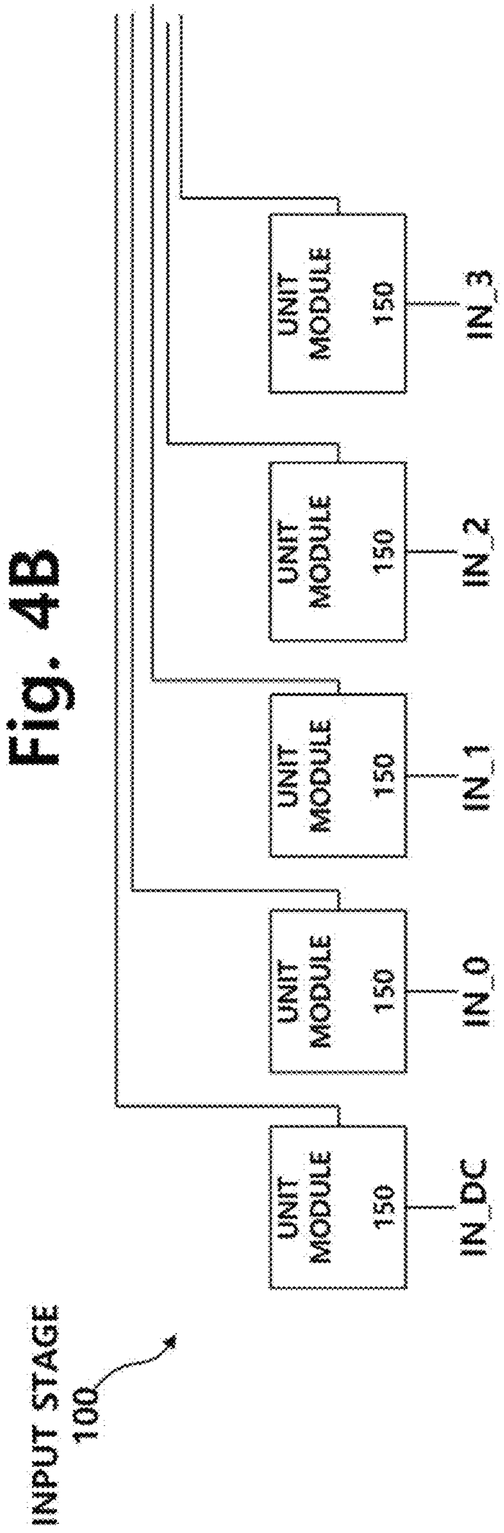

FIG. 3 is a block diagram illustrating an outline of an interpolation amplifier 10 according to the present embodiment. FIGS. 4A and 4B are schematic block diagrams illustrating an input stage. Referring to FIGS. 3, 4A, and 4B, the interpolation amplifier 10 includes an input selection unit 12 and an amplifier 14. The amplifier 14 may include an input stage 100, a load stage 200, and an output stage 300.

The input selection unit 12 receives 4-bit pixel data D[3,0] and generates and outputs n input voltages IN_0, IN_1, . . . , and IN_3 corresponding to the pixel data, and one voltage IN_DC to the input stage 100. Table 1 below is a table showing the provided 4-bit pixel data D[3,0] and five input voltages that are output.

As shown in FIG. 3 and Table 1 below, the input selection unit 12 may be a logic circuit that receives a high voltage VH and a low voltage VL and outputs 4-bit input signals IN_3, IN_2, IN_1, and IN_0 and the voltage IN_DC according to pixel data D[n−1, 0]. In the example shown in Table 1, the input selection unit 12 outputs the low voltage VL at a $k^{th}$ bit IN_K−1 of an input signal when a $k^{th}$ bit of the pixel data D[n−1, 0] is logic high and outputs the high voltage VH at a $k^{th}$ bit of the input signal when the $k^{th}$ bit of the pixel data is logic low.

In the shown embodiment, when pixel data D[3:0] is 0001, the signals IN_3, IN_2, IN_1, and IN_0 output by the input selection unit 12 may have voltages VH, VH, VH, VH, and VL, and the signal IN_DC may have the high voltage VH. As shown, the high voltage VH may be output as the signal IN_DC irrespective of the pixel data D[n−1,0]. As the signal IN_DC, the high voltage VH is always output to allow a current required for operation of the load stage 200 and the output stage 300 to flow.

TABLE 1

| D[3:0] | IN3 | IN2 | IN1 | IN0 | IN_DC |
|---|---|---|---|---|---|
| 0000 | VH | VH | VH | VH | VH |
| 0001 | VH | VH | VH | VL | VH |
| 0010 | VH | VH | VL | VH | VH |
| 0011 | VH | VH | VL | VL | VH |
| 0100 | VH | VL | VH | VH | VH |
| 0101 | VH | VL | VH | VL | VH |
| 0110 | VH | VL | VL | VH | VH |
| 0111 | VH | VL | VL | VL | VH |
| 1000 | VL | VH | VH | VH | VH |
| 1001 | VL | VH | VH | VL | VH |
| 1010 | VL | VH | VL | VH | VH |
| 1011 | VL | VH | VL | VL | VH |
| 1100 | VL | VL | VH | VH | VH |
| 1101 | VL | VL | VH | VL | VH |
| 1110 | VL | VL | VL | VH | VH |
| 1111 | VL | VL | VL | VL | VH |

FIGS. 4A and 4B are block diagrams illustrating an outline of the input stage 100 according to the present embodiment. The input stage generates currents corresponding to input signals IN_3, IN_2, IN_1, and IN_0 and outputs the generated currents to the load stage 200 (see FIG. 3). The input stage 100 converts the provided input voltage signals IN_3, IN_2, IN_1, and IN_0 into corresponding currents and outputs the currents. The input stage 100 may include a plurality of unit modules 150 that output a current corresponding to a provided input signal.

FIG. 4A illustrates an example in which the input stage 100 is implemented as the unit modules 150 to which a signal is input and which output a current corresponding to the signal. As described below, the unit module 150 may be implemented to include a connection source module 110 (see FIG. 5). In another example, the unit module 150 may be implemented to include a separate source module 120 (see FIG. 5). In still another example, the unit module 150 may be implemented to include the connection source module 110 (see FIG. 5) and the separate source module 120 (see FIG. 5).

In the illustrated embodiment, IN_0 corresponds to D[0] of D[3:0], IN_1 corresponds to D[1], IN_2 corresponds to D[2], and IN_3 corresponds to D[3]. An input provided for each site is a value that is twice a value of a previous site. For example, when a value of IN_j is 1 and a value of IN_j+1 is 1, a value of IN_j+1 is twice a value of IN_j at a previous site. Therefore, a magnitude of a current output when IN_j which is a $j^{th}$ input is provided is twice a magnitude of a current output when IN_j−1 which is a $j-1^{th}$ input is provided.

Referring to FIG. 4A, when the unit module 150 is formed using transistors having the same channel area, the number of unit modules 150 to which the input IN_j+1 is provided may be twice the number of unit modules 150 to which the input IN_j is provided. In addition, the number of unit modules 150 to which the input IN_j is provided may be 2j.

In one embodiment, IN_DC may have the high voltage VH irrespective of pixel data D[n−1,0], and the number of unit modules to which IN_DC is input may be one.

In the embodiment shown in FIG. 4B, the number of unit modules 150 to which each bit of an input signal is input may be the same, and a channel area of the transistor included in the unit module 150 to which each bit of an input signal IN_j+1 is input may differ by two times from those included in the unit module 150 to which each bit of an input signal IN_j is input. By forming the unit modules 150, magnitudes of currents corresponding to adjacent bits of an input signal may be made to differ by a factor of 2.

Figure 5:
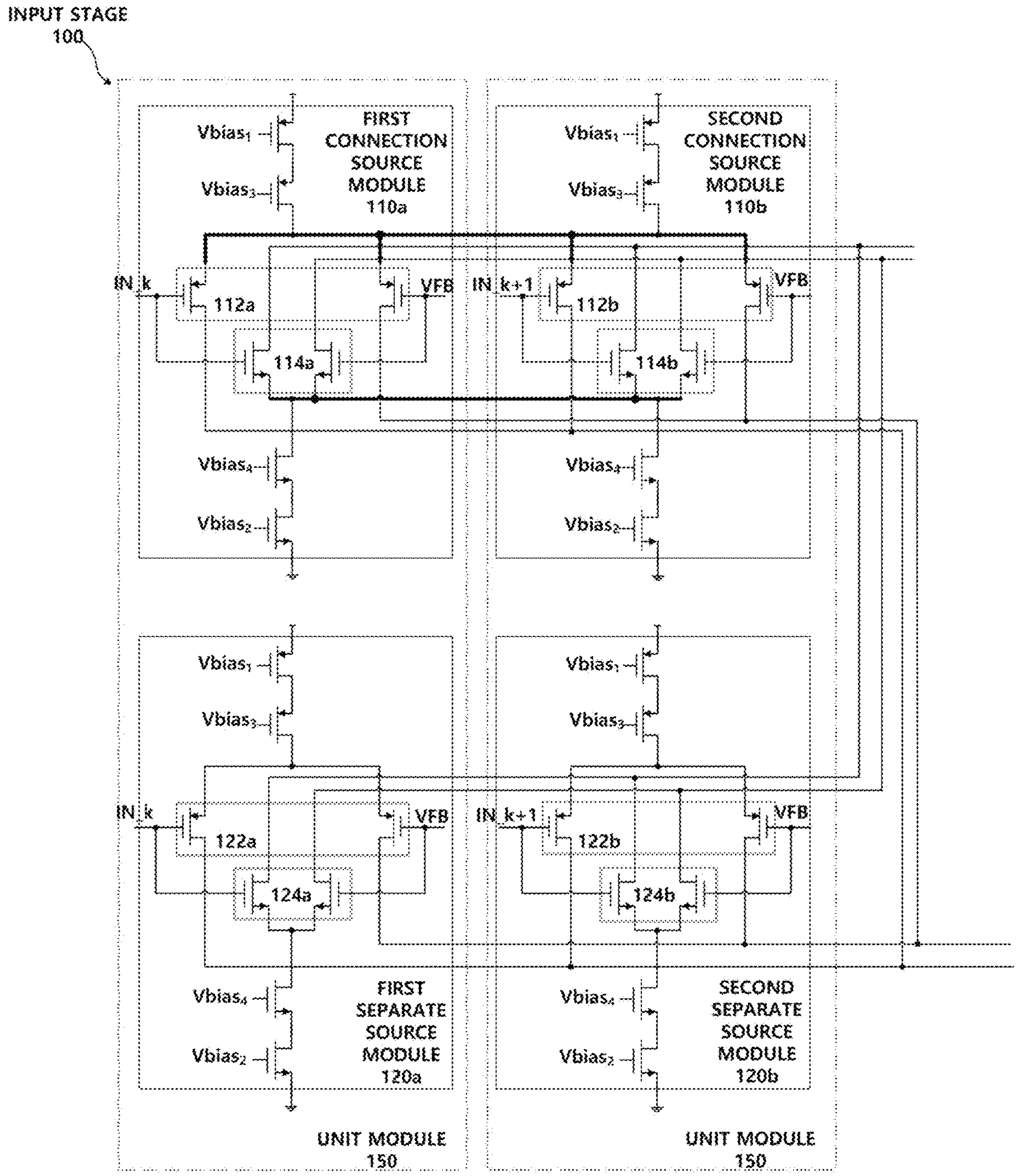
FIG. 5 is an exemplary circuit diagram of an input stage including two unit modules.

FIG. 5 is an exemplary circuit diagram of an input stage 100 including two unit modules. FIG. 5 illustrates an embodiment in which the input stage 100 is implemented as the unit modules each including a connection source module 110 and a separate source module 120. Referring to FIG. 5, the connection source module 110 includes two or more connection source modules 110*a* and 110*b* including a first differential pair 112 and a second differential pair 114, to which an input voltage IN_k is input and an output voltage VFB of an interpolation amplifier is fed back and input, a first current source connected to the first differential pair 112 to provide a bias current, and a second current source connected to the second differential pair to provide a bias current. Sources of first differential pairs 112*a* and 112*b* included in the two or more connection source modules 110*a* and 110*b* are connected to each other as shown in a bold line, and sources S of second differential pairs 114*a* and 114*b* included in the two or more connection source modules 110*a* and 110*b* are connected to each other as shown in a bold line.

In an example that is not shown, even when an input stage includes three or more connection source modules, sources of transistors included in first differential pairs are connected to each other, and sources of transistors included in second differential pairs are connected to each other.

In one embodiment, in the first differential pair 112*a* and the first differential pair 112*b* included in the first connection source module 110*a* and the second connection source module 110*b*, outputs of transistors to which input signals IN_k and IN_k+1 are provided are connected to each other, and outputs of transistors to which a fed-back output voltage VFB is provided are connected to each other.

In addition, in the second differential pair 114*a* and the second differential pair 114*b*, outputs of transistors to which the input signals IN_k and IN_k+1 are provided are connected to each other, and outputs of transistors to which the fed-back output voltage VFB is provided are connected to each other.

In an example that is not shown, when an input stage includes n connection source modules, in each of first differential pairs, outputs of transistors to which the input signals IN_k and IN_k+1 are provided are connected to each other, and outputs of transistors to which the fed-back output voltage VFB is provided are connected to each other. In addition, in each of second differential pairs, outputs of transistors to which the input signals IN_k and IN_k+1 are provided are connected to each other, and outputs of transistors to which the fed-back output voltage VFB is provided are connected to each other.

In one embodiment, the input stage 100 may include a plurality of separate source modules 120*a* and 120*b*. The separate source modules 120*a* and 120*b* include a third differential pair 122 to which the input signal IN_k is input and the output voltage VFB of the interpolation amplifier is fed back and input and of which sources are connected each other, a fourth differential pair 124 to which the input signal IN_k+1 is input and the output voltage VFB of the interpolation amplifier is fed back and input, and of which sources are connected to each other, a third current source connected to the third differential pair 122 to provide a bias current, and a fourth current source connected to the fourth differential pair 124 to provide a bias current. In two or more separate source modules 120*a* and 120*b*, a source of a third differential pair 122*a* included in one separate source module 120*a* is not electrically connected to a source of a third differential pair 122*b* included in the other separate source module 120*b*, and in the two or more separate source modules, a source of a fourth differential pair 124*a* included in one separate source module 120*a* is not connected to a source of a fourth differential pair 124*b* included in the other separate source module 120*b*.

In one embodiment, in the third differential pair 122*a* and the third differential pair 122*b* included in a first separate source module 120*a* and a second separate source module 120*b*, outputs of transistors to which the input signals IN_k and IN_k+1 are provided are connected to each other, and outputs of transistors to which the fed-back output voltage VFB is provided are connected to each other.

In addition, in the fourth differential pair 124*a* and the fourth differential pair 124*b*, outputs of transistors to which the input signals IN_k and IN_k+1 are provided are connected to each other, and outputs of transistors to which the fed-back output voltage VFB is provided are connected to each other.

In one embodiment, in the first differential pair 112*a*, the first differential pair 112*b*, the third differential pair 122*a*, and the third differential pair 122*b*, outputs of the transistors to which the input signals IN_k and IN_k+1 are provided are connected to each other and input to a load stage 200, and outputs of the transistors to which the fed-back output voltage VFB is applied are connected to each other and input to the load stage 200.

In addition, in the second differential pair 114*a*, the second differential pair 114*b*, the fourth differential pair 124*a*, and the fourth differential pair 124*b*, the outputs of the transistors to which the input signals IN_k and IN_k+1 are provided are connected to each other and input to the load stage 200, and the outputs of the transistors to which the fed-back output voltage VFB is provided are connected to each other and input to the load stage 200.

In the illustrated embodiment, the first differential pair 112 and the third differential pair 122 are respectively connected to the first current source and the third current source to receive a bias current, and the second differential pair 114 and the fourth differential pair 124 are respectively connected to the third current source and the fourth current source to receive a bias current.

In the illustrated embodiment, the first current source and the third current source are each illustrated as serially connected transistors having gate electrodes to which a bias voltage $Vbias_1$ is provided. However, this is merely an embodiment, and the first current source and the third current source may each be a single transistor or one branch of a current mirror to which a bias voltage is provided.

In the illustrated embodiment, the second current source and the fourth current source are each illustrated as serially connected transistors having gate electrodes to which the bias voltage $Vbias_2$ is provided. However, this is merely an embodiment, and the second current source and the fourth current source may each be a single transistor or one branch of a current mirror to which a bias voltage is provided.

For convenience of illustration and description, in the embodiment shown in FIG. 5, one first connection source module 110*a* and one first separate source module 120*a* to which the input signal IN_K is provided are shown, and one second connection source module 110*b* and one second separate source module 120*b* to which the input signal IN_K+1 is provided are shown. As shown in FIG. 4B, the present embodiment relates to a case in which a channel area of modules to which the input signal IN_K+1 is provided is twice a channel area of modules to which the input signal IN_K is provided. However, according to an embodiment that is not shown, the number of second connection source modules 110*b* may be twice the number of first connection source modules 110*a*, and the number of second separate source modules 120*b* may be twice the number of first separate source modules 120*a*.

In the embodiment shown in FIG. 5, when the input signal IN_k applied to the first differential pair 112*a*, the second differential pair 114*a*, the third differential pair 122*a*, and the fourth differential pair 124*a* is a low voltage VL, n-type metal oxide semiconductor (NMOS) transistors of the second differential pair 114*a* and the fourth differential pair 124*a* to which the input signal IN_k is applied are turned off, but p-type metal oxide semiconductor (PMOS) transistors of the first differential pair 112*a* and the third differential pair 122*a* to which the input signal IN_k is applied are turned on. Therefore, a current provided from the current source is provided to the load stage 200 (see FIG. 3) through a drain electrode, which is an output node, to generate a corresponding voltage.

In addition, when the input signal IN_k+1 applied to the first differential pair 112*b*, the second differential pair 114*b*, the third differential pair 122*b*, and the fourth differential pair 124*b* is a low voltage VL, NMOS transistors of the second differential pair 114*b* and the fourth differential pair 124*b* to which the input signal IN_k+1 is applied are turned off, but PMOS transistors of the first differential pair 112*b* and the third differential pair 122*b* to which an input is applied are turned on. A current supplied from the current source is provided to the load stage through a drain electrode which is an output node. A case in which the input signal IN_k+1 is the low voltage VL has been described, but in a case in which the input signal IN_k+1 is the high voltage VH, the second and fourth differential pairs to which an input is provided are turned on, and a current is provided to the load stage to generate a corresponding voltage.

A voltage generated in the load stage 200 (see FIG. 3) corresponds to a voltage generated by overlapping a voltage generated by a current output from the first connection source module 110*a* and the first separate source module 120*a* with a voltage generated by a current output from the second connection source module 110*b* and the second separate source module 120*b*.

Figure 6:
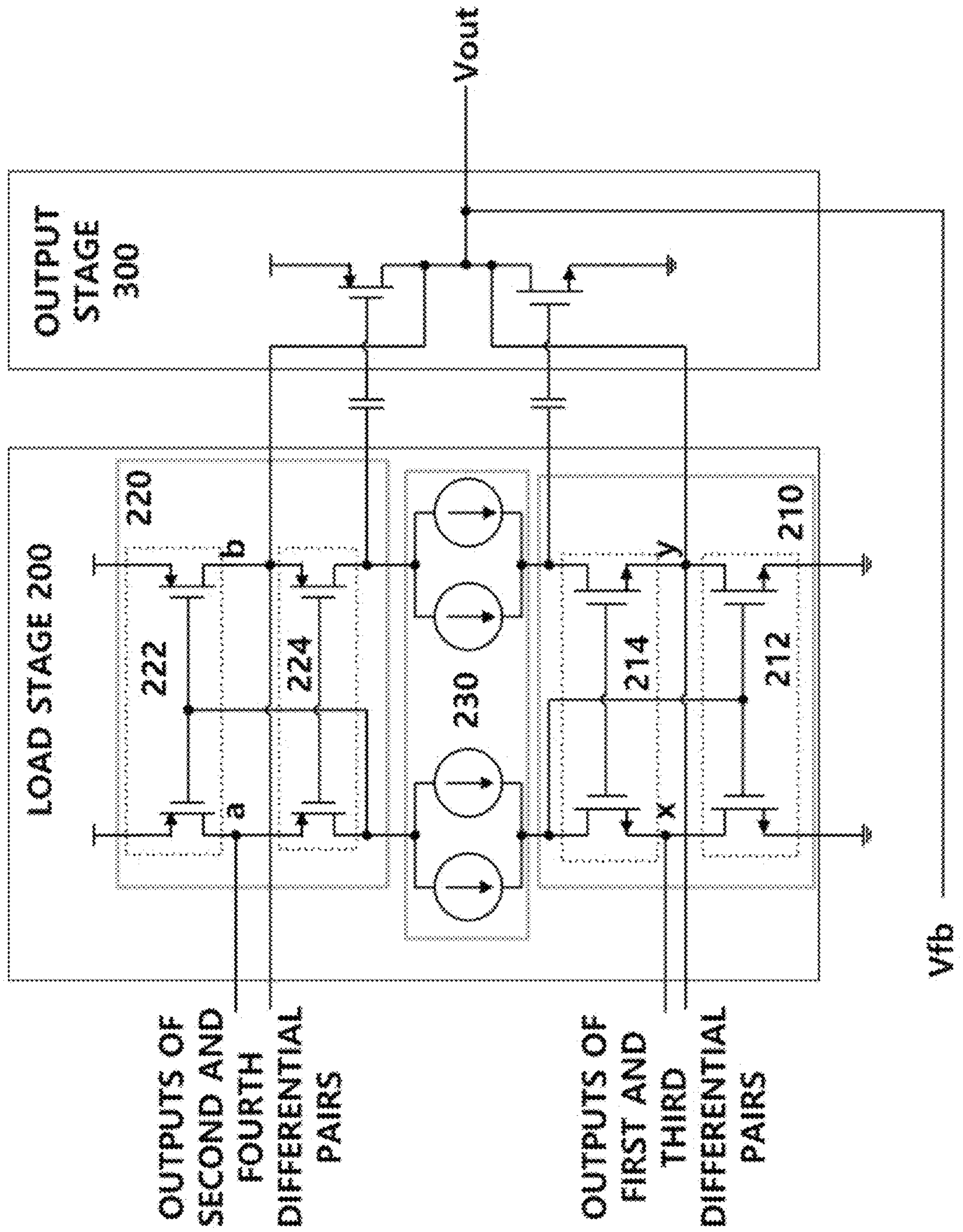
FIG. 6 is a schematic circuit diagram of a load stage and an output stage.

FIG. 6 is a schematic circuit diagram of a load stage 200 and an output stage 300. Referring to FIG. 6, the load stage 200 includes a folded cascode circuit 210 of an NMOS transistor, a folded cascode circuit 220 of a PMOS transistor, and current sources 230 connected between the folded cascode circuit 220 of the PMOS transistor and the folded cascode circuit 210 of the NMOS transistor and connected to each other in parallel.

The NMOS folded cascode circuit 210 includes a first paired gate circuit 212 including transistors of which gates are connected and a second paired gate circuit 214 including transistors of which gates are connected. The first paired gate circuit 212 and the second paired gate circuit 214 are connected through a cascode. In the first paired gate circuit 212, a node to which the gate is connected is connected to a drain electrode of the transistor of the second paired gate circuit 214.

The PMOS folded cascode circuit 220 includes a third paired gate circuit 222 including transistors of which gates are connected and a fourth paired gate circuit 224 including transistors of which gates are connected. The third paired gate circuit 222 and the fourth paired gate circuit 224 are connected through a cascode. In the third paired gate circuit 222, a node to which the gate is connected is connected to a drain electrode of the transistor of the fourth paired gate circuit 224.

In a first differential pair 112*a*, a first differential pair 112*b*, a third differential pair 122*a*, and a third differential pair 122*b*, an output current of transistors to which input signals IN_k and IN_k+1 are provided is input to an x node of the load stage 200, and an output current of transistors to which a fed-back output voltage VFB is provided is input to a y node of the load stage 200 and converted into a corresponding voltage.

In addition, in a second differential pair 114*a*, a second differential pair 114*b*, a fourth differential pair 124*a*, and a fourth differential pair 124*b*, outputs of transistors to which the input signals IN_k and IN_k+1 are provided are connected to each other and input to an a node of the load stage 200, and outputs of transistors to which the fed-back output voltage VFB is provided are connected to each other and input to a b node of the load stage 200 and converted into a corresponding voltage.

A converted voltage output from the load stage 200 is provided to the output stage 300 through a coupling capacitor. In the illustrated embodiment, the output stage 300 includes a push-pull amplifier including a PMOS transistor and an NMOS transistor. However, in other embodiments that are not shown, the output stage may be implemented as other power amplifier circuits. Accordingly, a current output from the input stage 100 is converted into a voltage in the load stage, and an amplified output voltage from the output stage is fed back and provided to the input stage 100.

Simulation Results

Hereinafter, results of a simulation experiment of an interpolation amplifier according to the present embodiment will be described with reference to FIGS. 7 to 9. For the simulation experiment, integral non-linearity (INL) was measured by measuring an interpolation voltage output when 4-bit pixel data D[3:0] was provided.

Figure 7:
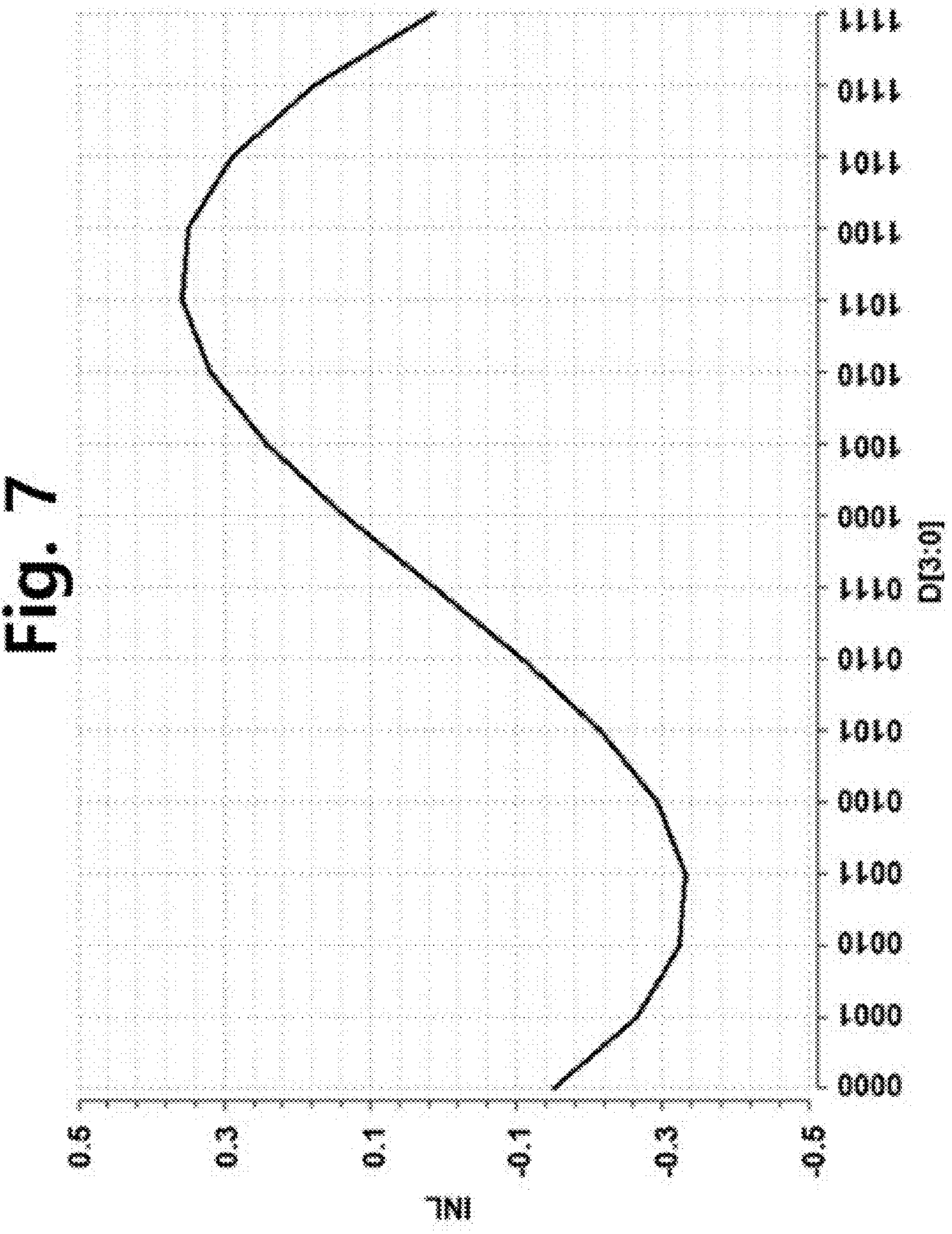
FIG. 7 is a diagram showing integral non-linearity (INL) when an input stage is formed only with a separate source module.

FIG. 7 is a diagram showing INL when an input stage is formed only with a separate source module. Referring to FIG. 7, as a value of the pixel data D[3:0] increases from 0000 to 0011, the INL gradually decreases, but as the pixel data increases from 0011 to 1011, the INL also increases. Next, it can be seen that as the pixel data increases from 1100 to 1111, the INL decreases again.

Figure 8:
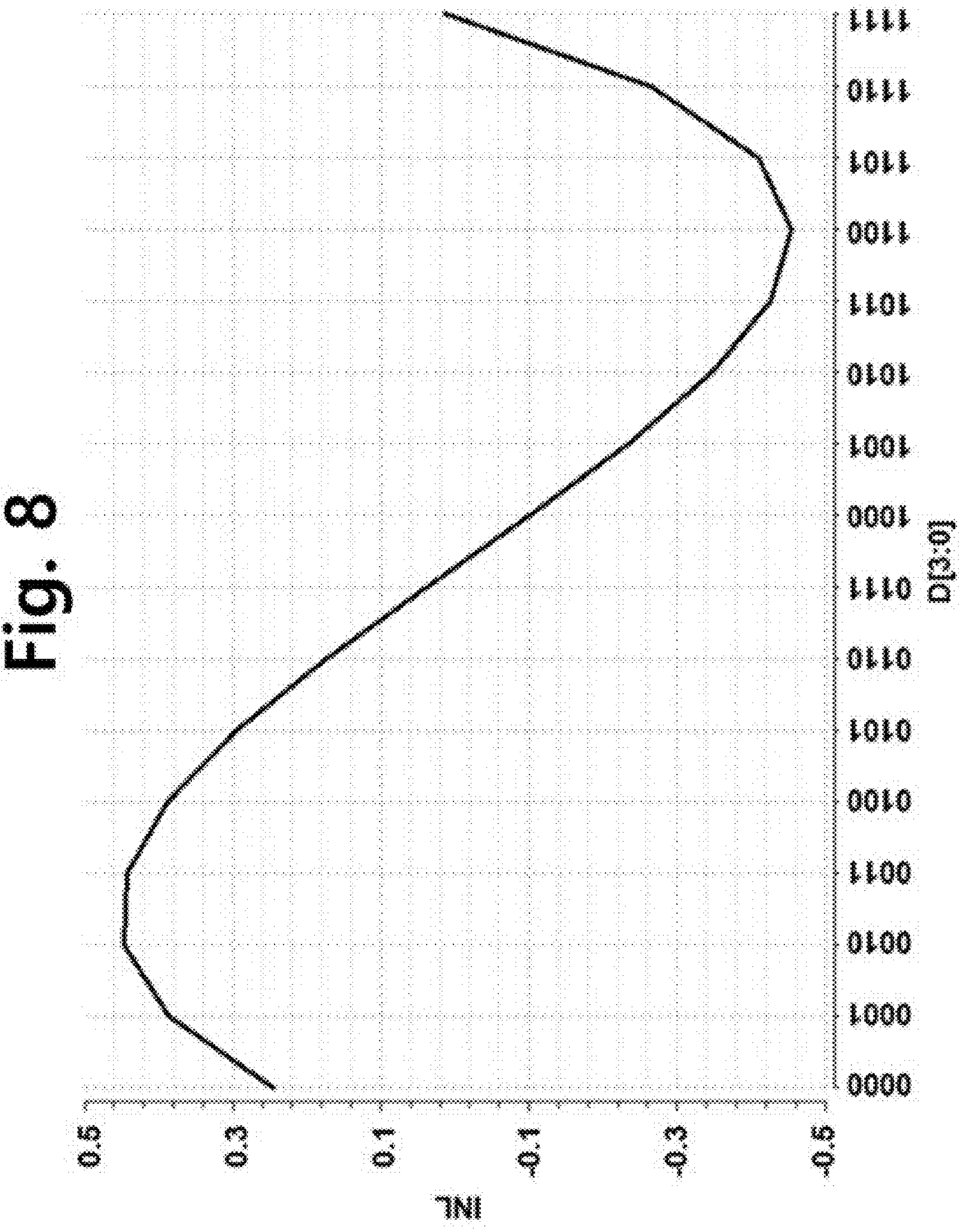
FIG. 8 is a diagram showing INL when an input stage is formed only with a connection source module.

FIG. 8 is a diagram showing INL when an input stage is formed only with a connection source module. Referring to FIG. 8, it can be seen that a change trend of the INL has an aspect that is approximately opposite to a case in which the input stage is formed only with the separate source module. In other words, as a value of pixel data D[3:0] increases from 0000 to 0010, the INL gradually increases, but as the pixel data increases from 0011 to 1100, the INL decreases. Next, it can be seen that as the pixel data increases from 1100 to 1111, the INL increases again.

Figure 9:
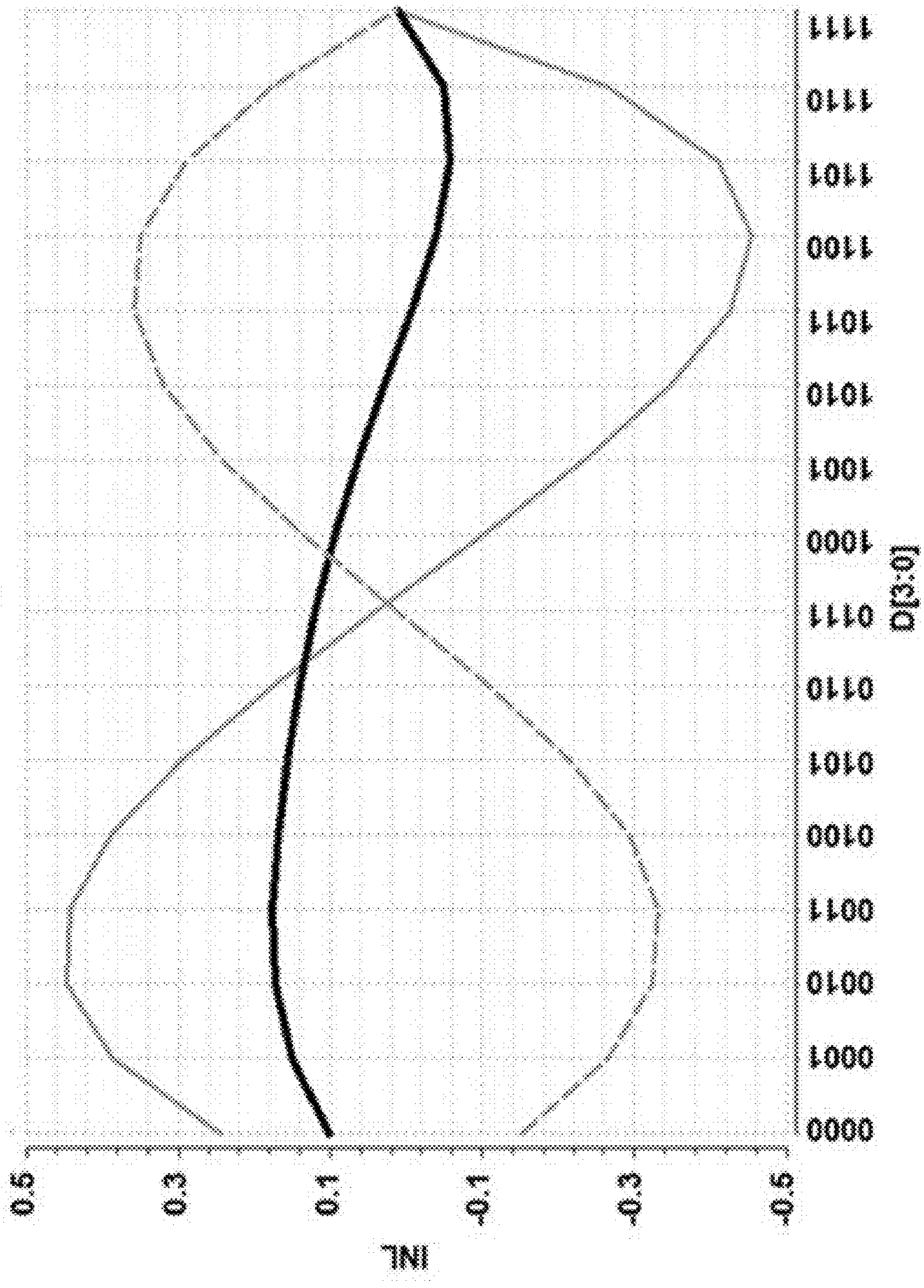
FIG. 9 is a diagram showing INL when an input stage is formed to include both a connection source module and a separate source module.

FIG. 9 is a diagram showing INL when an input stage is formed to include both a connection source module and a separate source module. In FIG. 9, a solid gray line indicates INL when the input stage is formed with the connection source module, a dashed line indicates INL when the input stage is formed with the separate source module, and a solid black line indicates INL when the input stage is formed including both the connection source module and the separate source module.

Looking at FIG. 9, it can be seen that that an absolute value of INL, which represents nonlinearity, is largest in the separate source module shown by the solid gray line. Therefore, it can be seen that an interpolation amplifier and a source driver including an input stage consisting only of separate source modules have significantly degraded characteristics due to nonlinearity.

In an interpolation amplifier and a source driver including an input stage consisting of only a connection source module shown by the dashed line, characteristics due to nonlinearity are somewhat alleviated, and thus the linearity of an interpolation amplifier and a source driver consisting of only a separate source module is somewhat improved.

However, in the interpolation amplifier and the source driver which include both the separate source module and the connection source module shown in dark black, it can be seen that the nonlinear characteristics offset each other to have a low INL deviation, resulting in improved linearity.

Although the embodiments shown in the drawings are described as a reference for helping understanding of the present disclosure, they are embodiments for implementation, and merely exemplary, and those skilled in the art will understand that various modifications and equivalents are possible therefrom. Accordingly, the true technical scope of the present disclosure should be defined by the appended claims.

The invention claimed is:

1. An interpolation amplifier comprising:

an input stage;

a load stage; and an output stage, wherein the input stage includes a plurality of connection source modules to which an input signal with a plurality of bits is provided, the connection source modules each include a first differential pair and a second differential pair to which an input voltage is input and an output voltage of the interpolation amplifier is fed back and input, a first current source connected to the first differential pair to provide a bias current, and a second current source connected to the second differential pair to provide a bias current, sources of the first differential pairs included in the plurality of the connection source modules are connected to each other to form a single electrical mode, sources of the second differential pairs included in the plurality of the connection source modules are connected to each other to form a single electrical node, the input stage further includes a plurality of separate source modules to which the input signals with the plurality of bits are provided, the separate source modules each include a third differential pair to which the input voltage is input and the output voltage of the interpolation amplifier is fed back and input and of which sources are connected to each other, a fourth differential pair to which the input voltage is input and the output voltage of the interpolation amplifier is fed back and input and of which sources are connected to each other, a third current source connected to the third differential pair to provide a bias current, and a fourth current source connected to the fourth differential pair to provide a bias current, a source of the third differential pair included in one separate source module of two or more of the separate source modules is not connected to a source of the third differential pair included in an other separate source module, and a source of the fourth differential pair included in one separate source module of two or more of the separate source modules is not connected to a source of the fourth differential pair included in the other separate source module.

2. The interpolation amplifier of claim 1, further comprising an input selection unit to which pixel data is input and which generates and outputs an input signal corresponding to the pixel data.

3. The interpolation amplifier of claim 1, wherein a number of the connection source modules to which a jth bit of the input signal is input is twice of a number of the connection source modules to which a j-1th bit of the input signal is input, and a number of the separate source modules to which the jth bit of the input signal is input is twice a number of the separate source modules to which the j-1th bit of the input signal is input, wherein j is a natural number.

4. The interpolation amplifier of claim 1, wherein a channel area of a transistor included in the connection source module to which a jth bit of the input signal is input is twice a channel area of a transistor included in the connection source module to which a j-1th bit of the input signal is input, and a channel area of a transistor included in the separate source module to which the jth bit of the input signal is input is twice a channel area of a transistor included in the separate source module to which the j-1th bit of the input signal is input, wherein j is a natural number.

5. The interpolation amplifier of claim 1, wherein outputs of the first differential pairs included in the plurality of connection source modules are connected to correspond to each other, outputs of the second differential pairs included in the plurality of connection source modules are connected to correspond to each other, outputs of the third differential pairs included in the plurality of separate source modules are connected to correspond to each other, and outputs of the fourth differential pairs included in the plurality of separate source modules are connected to correspond to each other.

6. The interpolation amplifier of claim 1, wherein the load stage includes:

a folded cascode circuit of a first conductive type;

current sources connected in parallel; and a folded cascode circuit of a second conductive type.

7. An interpolation amplifier for outputting a voltage corresponding to an input signal with a plurality of bits, the interpolation amplifier comprising:

an input stage including a plurality of unit modules configured to receive one bit of the plurality of bits of the input signal and generate a current corresponding to the bit;

a load stage configured to generate a voltage corresponding to the current output by the input stage; and an output stage configured to output the voltage generated by the load stage, wherein an output voltage generated in the output stage is fed back and input to the input stage, the input stage includes a number of unit modules corresponding to the number of bits of the input signal, each unit module of the plurality of unit modules included in the input stage includes a connection source module comprising:

a first differential pair including transistors of a first conductive type; and a second differential pair including transistors of a second conductive type, sources of the transistors included in the first differential pairs included in the plurality of unit modules are all electrically connected to form a single electrical node, sources of the transistors included in the second differential pairs included in the plurality of unit modules are all electrically connected to form a single electrical node, each unit module of the plurality of unit modules included in the input stage further includes:
a first current source configured to provide a bias current to the first differential pair; and
a second current source configured to provide a bias current to the second differential pair, and
the plurality of unit modules further include separate source modules,
between the plurality of unit modules, sources of the transistors included in the first differential pairs are not electrically connected, and
between the plurality of unit modules, sources of the transistors included in the second differential pairs are not electrically connected.

8. The interpolation amplifier of claim 7, wherein the input stage further includes at least one unit module configured to output a bias current.

9. The interpolation amplifier of claim 7, wherein, in the plurality of unit modules,
an output of the first differential pair included in one of the unit modules is connected to an output of the first differential pair included in an other of the unit modules, and an output of the second differential pair included in one of the unit modules is connected to an output of the second differential pair included in the other of the unit modules.

10. A source driver for driving a plurality of pixels included in a display panel, the source driver comprising:
an interpolation amplifier configured to output a voltage corresponding to an input signal with a plurality of bits,
wherein the interpolation amplifier includes an input stage including a plurality of unit modules configured to receive one bit of the plurality of bits of the input signal and generate a current corresponding to the bit, a load stage configured to generate a voltage corresponding to the current output by the input stage, and an output stage configured to output the voltage generated by the load stage,
an output voltage generated in the output stage is fed back and input to the input stage,
the input stage includes a number of unit modules corresponding to the number of bits of the input signal,
each unit module of the plurality of unit modules included in the input stage includes:
a first differential pair including transistors of a first conductive type; and
a second differential pair including transistors of a second conductive type,
sources of the transistors included in the first differential pairs included in the plurality of unit modules are all electrically connected to form a single electrical node,
sources of the transistors included in the second differential pairs included in the plurality of unit modules are all electrically connected to form a single electrical node,
each unit module of the plurality of unit modules included in the input stage further includes:
a first current source configured to provide a bias current to the first differential pair; and
a second current source configured to provide a bias current to the second differential pair, and
the plurality of unit modules further include separate source modules,
between the plurality of unit modules, sources of the transistors included in the first differential pairs are not electrically connected, and
between the plurality of unit modules, sources of the transistors included in the second differential pairs are not electrically connected.

11. The source driver of claim 10, wherein the input stage further includes at least one unit module configured to output a bias current.

12. The source driver of claim 10, wherein, in the plurality of unit modules, an output of the first differential pair included in one of the unit modules is connected to an output of the first differential pair included in an other of the unit modules, and
an output of the second differential pair included in one of the unit modules is connected to an output of the second differential pair included in the other of the unit modules.

* * * * *